United States Patent [19]

Diederich

[11] 3,986,751
[45] Oct. 19, 1976

[54] HOUSING AND BEARING ASSEMBLY FOR A WINDSHIELD WIPER SYSTEM
[75] Inventor: James N. Diederich, Dayton, Ohio
[73] Assignee: General Motors Corporation, Detroit, Mich.
[22] Filed: May 27, 1975
[21] Appl. No.: 580,618

[52] U.S. Cl. .................................. 308/26; 308/238
[51] Int. Cl.² ...................................... F16C 33/74
[58] Field of Search ............... 308/3 R, 15, 26, 36.1, 308/238, 237 R, 237 A; 287/93; 151/41.75; 85/8.8

[56] References Cited
UNITED STATES PATENTS

| 3,299,737 | 1/1967 | Hurlin | 308/15 X |
| 3,787,103 | 1/1974 | MacMillan | 308/26 |
| 3,845,998 | 11/1974 | McElhinney | 308/15 X |

Primary Examiner—M. H. Wood, Jr.
Assistant Examiner—Gene A. Church
Attorney, Agent, or Firm—Donald F. Scherer

[57] ABSTRACT

A housing and bearing assembly in which an ocillating shaft is rotatably supported. Two bearings are positioned in the housing to provide said support. One of the bearings is located in a small diameter portion of the housing and may be retained therein by a circumferential protuberance formed in the housing. The other bearing is pressed into a larger diameter portion of the housing which has a plurality of tapered or other geometric shaped ramps formed therein. As the bearing abuts the ends of the ramps during assembly, the ramps shear from the housing to form axial columnar supports for the bearing to prevent further intrusion of the bearing into said housing after the desired bearing position is attained by the pressing operation.

4 Claims, 6 Drawing Figures

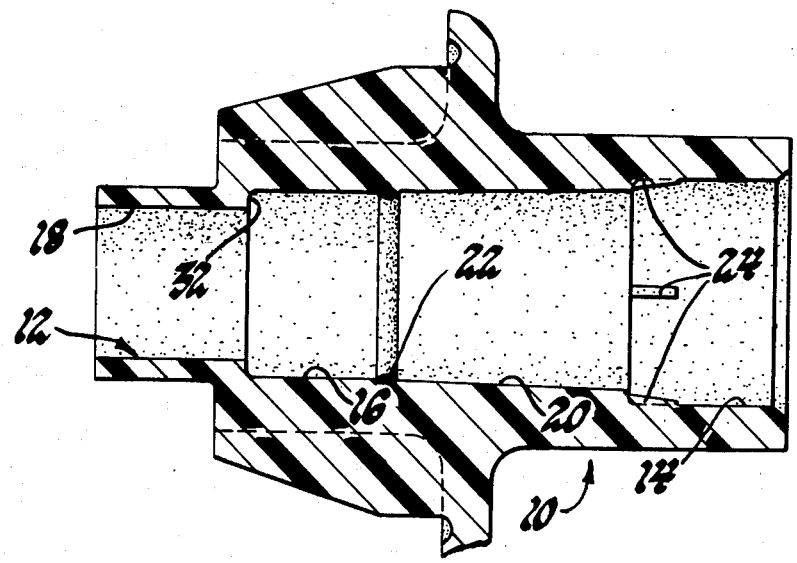

HOUSING AND BEARING ASSEMBLY FOR A WINDSHIELD WIPER SYSTEM

This invention relates to housing and bearing assemblies and more particularly to such assemblies wherein at least one bearing is positioned by deformable means within said housing.

In windshield wiper system mechanisms the oscillating shaft to which the windshield wiper arm is connected is rotatably supported in a housing in two bearings that are spaced apart. In most prior mechanisms of this type, one bearing in the housing is pressed to a predetermined position near or against a shoulder while the other bearing is press fitted into the housing to a predetermined location. When the drive shaft is inserted in the housing, it is secured there in such a manner that the one bearing is trapped to prevent movement of the bearing out of the housing. However, it is possible for the bearing to move further into the housing if extraordinarily high axial loads are applied through the wiper drive mechanism, or if hoop stresses diminish due to plastic creep phenomenon. If the bearing should intrude further into the housing, an end play condition occurs in the drive mechanism which is detrimental to the efficient operation of the wiper system.

The present invention seeks to eliminate the possibility of the bearing being driven further into the housing such that end play would result by providing columnar supports within the housing to prevent such movement. These columnar supports are formed in the housing in the form of tapered or other geometric shape ramps such that when the bearing is inserted into the housing the ramps will shear from the housing and be compressed and expand within the housing to form the axial columnar support for the bearing such that further movement of the bearing into the housing is prevented.

The other support bearing in the housing is positioned near or against a shoulder in the housing. The housing may also incorporate a circumferential protuberance which is adjacent to one end of the bearing to assist in retaining the bearing.

It is an object of this invention to provide an improved housing and bearing assembly wherein a bearing is supported axially in a bore in the housing by shearable ramps which are partially sheared from the housing inner wall during assembly of the bearing to form a plurality of columnar supports for the bearing.

Another object of this invention is to provide an improved housing and bearing assembly wherein two bearings are inserted into a stepped diameter bore in the housing so that one bearing is positioned near or against a shoulder in a bore and retained therein by a circumferential protuberance on the housing and the other bearing is axially supported in one direction by ramps formed in the housing and partially sheared therefrom during assembly of the bearing into the housing to form columnar supports for the bearing.

These and other objects and advantages of the present invention will be more apparent from the following description and drawings in which:

FIG. 1 is a cross sectional view of the housing before the bearings are inserted;

FIG. 2 is a cross sectional view of housing, bearing and shaft assembly;

FIG. 3 is an end view of the housing shown in FIG. 1;

FIG. 4 is a cross sectional view taken along line 4—4 of FIG. 3;

FIG. 5 is an enlarged view of the bearing and housing as assembled; and

FIG. 6 is a view taken along line 6—6 of FIG. 5.

Referring to the drawings wherein like characters represent the same or corresponding parts, there is shown in FIG. 1, a housing 10 which is preferably made from a plastic material. The housing 10 has a stepped diameter bore 12 which is centrally located in the housing and includes a large diameter portion 14, a smaller diameter portion 16, and a still smaller diameter portion 18, the diameters 14 and 16 are connected by a frustoconical portion 20. The frustoconical portion 20 is not necessary to the invention but it does provide for more simpler assembly of the forward bearing as can be seen later. At the juncture line formed by the conical section 20 and the small diameter 16 there is formed on the inner wall of the stepped bore 12 a circumferential protuberance 22. A plurality of ramp portions 24 are formed on the wall of the large diameter 14. These ramps are best seen in FIG. 4. As can be seen in FIG. 4, the ramps 24 have a continuous surface 26 which begins at the surface of bore 14 and ends at the surface of the tapered portion 20 such that this surface is contiguous to the large diameter bore 14 and the conical portion 20, or if the conical portion 20 is eliminated and a straight bore is used in place thereof, the surface would be contiguous to the small diameter bore 16.

As seen in FIG. 2, two bearings 28 and 30 are inserted into the stepped bore 12. Preferably the bearings 28 and 30 are press fitted into the housing 10 to aid in their retention therein. The bearing 28 is press fitted into the housing 16 near or against a shoulder 32 formed in the housing 10 and has a tapered leading edge 34 which permits the bearing to easily compress and pass over the protuberance 22. Once the bearing is in position near or against shoulder 32, the protuberance 22 is permitted to return to its normal state and assist in securing the bearing in its position in the housing 10. The conical portion 20 permits easy alignment of bearing 28 and diameter 16 during assembly.

The bearing 30 is press fitted into the large diameter bore 14. During assembly of bearing 30 the leading edge 36 thereof will abut the surface 26 of ramps 24. Further pressing of the bearing will cause the ramps 24 to shear from the bore 14 and be compressed and provide a bulging surface such as 38 shown in FIGS. 5 and 6. This surface acts against the leading edge 36 of the bearing 30 to provide a columnar support for the bearing 30 and assist in preventing further intrusion of the bearing into the housing 10 after the desired position of the bearing has been attained. To complete the assembly, a shaft 40 is installed in the bearings 30 and 28 and is retained in the housing by an end cap 42 which has an outer serrated surface which is adapted to permit securing of the windshield wiper arm to shaft 40. The end cap 42 is retained on the shaft 40 by a spline, not shown, and by a cold working operation performed on the shaft 40 which results in an expanded head 44 being formed on the shaft 40. The other end of shaft 40 has assembled thereon a spring washer 46 and a drive arm 48 which is adapted to be connected into a conventional windshield wiper drive mechanism. The end of shaft 40 has formed thereon a head 50 which prevents the assembly from moving axially within the housing 10.

As can be seen, the end cap 42 abuts an end surface 52 of the housing 10. Thus, the bearing 30 is trapped in the housing and cannot move toward the head 50 of shaft 40. The columnar supports formed by ramps 24 prevent the further intrusion of the bearing 30 into housing 10 and thus the end play of shaft 40 is limited. Since the assembly of shaft 40 is completed with the cold forming operation 44, the distance between the head 50 and end 44 is determined at that point in the assembly operation and therefore the leading edge 36 of bearing 30 is also determined at that time. Due to this fact, the leading surface 36 of bearing 30 cannot be pressed against the shoulder as this would provide another limitation on the assembly operation which cannot be easily compensated for in conventional assembly practices.

The above described embodiment is illustrative of the invention which may be modified within the scope of the appended claims.

What is claimed is:

1. A housing and bearing assembly comprising; a housing having a stepped diameter bore including large and small diameter portions, and a plurality of ramps formed integrally with the housing and having a surface contiguous with the large and small diameter portions of the stepped bore; a first bearing disposed in said small diameter portion; a second bearing disposed in said large diameter portion abutting said ramps, said ramps being shearable from said large diameter portion to form a plurality of columnar supports for said second bearing; and means including a shaft and fastening means for retaining said second bearing in said housing.

2. A housing and bearing assembly comprising; a housing having a stepped diameter bore including large and small diameter portions, a plurality of ramps formed integrally with the housing and having a surface contiguous with the large and small diameter portions of the stepped bore, and a circumferential protuberance formed on the small diameter portion; a first bearing disposed in said small diameter portion, said first bearing being retained therein by said protuberance; a second bearing disposed in said large diameter portion abutting said ramps, said ramps being shearable from said large diameter portion to form a plurality of columnar supports for said second bearing; and means including a shaft and fastening means for retaining said second bearing in said housing.

3. A housing and bearing assembly comprising; a housing having a stepped diameter bore including large and small diameter portions, a frustoconical portion connecting said diameter portions, a plurality of tapered ramps formed integrally with the housing and having a surface contiguous with the large diameter portion and the frustoconical portion of the stepped bore, and a circumferential protuberance formed on the frustoconical portion adjacent the small diameter portion; a first bearing disposed in said small diameter portion, said first bearing being retained therein by said protuberance; a second bearing disposed in said large diameter portion abutting said tapered ramps, said tapered ramps being shearable from said large diameter portion to form a plurality of columnar supports for said second bearing; and means including a shaft and fastening means for retaining said second bearing in said housing.

4. A housing and bearing assembly comprising; a housing having a stepped diameter bore including large and small diameter portions, a frustoconical portion connecting said diameter portions, and a plurality of tapered ramps formed integrally with the housing and having a surface contiguous with the large diameter portion and the frustoconical portion of the stepped bore; a first bearing disposed in said small diameter portion; a second bearing disposed in said large diameter portion abutting said tapered ramps, said tapered ramps being shearable from said large diameter portion to form a plurality of columnar supports for said second bearing; and means including a shaft and fastening means for retaining said second bearing in said housing.

* * * * *